United States Patent
Makino et al.

(10) Patent No.: US 6,564,110 B1
(45) Date of Patent: May 13, 2003

(54) POSITION CONTROLLING APPARATUS CAPABLE OF REDUCING THE EFFECT OF DISTURBANCE

(75) Inventors: Kenichi Makino, Hiratsuka (JP); Yoshiyuki Tomita, Hiratsuka (JP); Hidehiko Mori, Hachioji (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 407 days.

(21) Appl. No.: 09/588,530

(22) Filed: Jun. 7, 2000

(51) Int. Cl.$^7$ .............................................. G05B 19/18
(52) U.S. Cl. ........................... 700/56; 700/55; 700/57; 700/58; 318/116; 318/370; 318/375; 318/379; 360/77.04; 360/77.08
(58) Field of Search ........................ 318/116, 370–380, 318/560–696; 360/77.04, 77.08; 700/55, 56, 57, 58

(56) References Cited

U.S. PATENT DOCUMENTS

| | | | |
|---|---|---|---|
| 5,032,777 A | | 7/1991 | Ogawa |
| 5,157,596 A | * | 10/1992 | Alcone ........................ 700/55 |
| 5,418,440 A | * | 5/1995 | Sakaguchi et al. .......... 318/560 |
| 5,506,794 A | * | 4/1996 | Lange ........................ 702/104 |
| 5,736,824 A | * | 4/1998 | Sato et al. .................. 318/561 |
| 5,952,804 A | * | 9/1999 | Hamamura et al. ......... 318/560 |
| 5,991,525 A | * | 11/1999 | Shah et al. .................... 703/2 |
| 6,202,033 B1 | * | 3/2001 | Lange ........................ 702/104 |
| 6,285,971 B1 | * | 9/2001 | Shah et al. .................... 703/2 |
| 6,493,601 B1 | * | 12/2002 | Wells et al. ................. 700/128 |

FOREIGN PATENT DOCUMENTS

| | | |
|---|---|---|
| JP | 1-137305 | 5/1989 |
| JP | 5-315894 | 11/1993 |
| JP | 9-282008 | 10/1997 |

OTHER PUBLICATIONS

Taeg–Joon Kweon, Dong–Seok Hyun; "High Performance Speed Control of Electric Machine Using Kalman Filter and Self–tuning Regulator"; 1998; Hanyang University, Korea; pp. 280–286.*

* cited by examiner

Primary Examiner—John Follansbee
Assistant Examiner—Thomas Pham
(74) Attorney, Agent, or Firm—Arent Fox Kintner Plotkin & Kahn

(57) ABSTRACT

A discrete Kalman filter 12 and a disturbance estimating unit 13 are added to a feedback loop for feeding back a detected value of position from a position detector 6. The Kalman filter estimates position and velocity of an object to be controlled, thereafter outputting an estimated value of position and an estimated value of velocity. The disturbance estimating unit estimates from a command value of current and the estimated value of velocity the disturbance that is added to a load 5. The estimated value of position is fed back to a position controller 1, and the estimated value of velocity is fed back to a velocity controller 2. Further, a difference between a target value of current outputted from the velocity controller and the estimated value of disturbance is output as the command value of current.

2 Claims, 4 Drawing Sheets

POSITION CONTROLLING APPARATUS CAPABLE OF REDUCING THE EFFECT OF DISTURBANCE

BACKGROUND OF THE INVENTION

The present invention relates to a position controlling apparatus for performing the positioning of an object being moved with a high degree of precision.

A typical position controlling apparatus will now be explained with reference to FIG. 1. The position controlling apparatus includes a position controller 1, a velocity controller 2, a motor drive 3, a motor 4 for driving a load 5 that is an object to be controlled, a position detector 6 such as a pulse encoder that is provided to the motor 4, a velocity computing unit 7, and subtracters 8 and 9. The subtracters 8 and 9 may be called a first subtracter and a second subtracter, respectively. The load 5 is, for example, an X—Y table for moving a piece to be worked on in the X and Y directions. In this case, as the motor 4, a servo motor is suitable.

The function of the position controlling apparatus will hereafter be explained. From a setting unit not illustrated there is given a command value $X_r$ of position. The position detector 6 detects the displacement of the object to be controlled to thereby output a detected value $X_m$ of position. The velocity computing unit 7 differentiates the detected value $X_m$ of position to thereby compute a detected value of velocity. The subtracter 8 subtracts the detected value $X_m$ of position from the command value $X_r$ of position to thereby compute a position error. The position controller 1 amplifies the position error to thereby compute a command value of velocity and outputs this value. The subtracter 9 subtracts the detected value of velocity from the command value of velocity to thereby compute a velocity error. The velocity controller 2 amplifies the velocity error to thereby compute a command value $i_c$ of current. The command value $i_c$ of current that has been computed is applied to the motor drive 3. The motor drive 3 drives the motor 4 in accordance with the command value $i_c$ of current.

FIG. 2 is a block diagram of FIG. 1. The symbol $G_p(z)$ in FIG. 2 represents a transfer function of the position controller 1. $G_v(z)$ represents the transfer function of the velocity controller 2. $K_t$ represents a torque constant of the motor 4. $(1/J_s^2)$ represents the transfer function of the object to be controlled. $(1 - z^{-1})$ represents the transfer function of the velocity computing unit 7. Here, it is assumed that $\tau_d$ represents a disturbance torque. In this case, since the object to be controlled is driven by a sum of the motor torque $\tau_m$ and the disturbance torque $\tau_d$ an error occurs when the positioning operation is performed.

In order to decrease the occurrence of the error due to the disturbance torque $\tau_d$, it has been considered appropriate to adjust the position controller 1 or velocity controller 2. However, when increasing the gain of the position controller 1 or velocity controller 2 in order to obtain the effect of suppressing the disturbance, the control system is likely to become unstable. This is due to the mechanical vibrations of the object to be controlled or to a phase lag in the sampling period of the position controller 1 and the velocity controller 2.

On the other hand, the detected value $X_m$ of position contains measurement noises $X_n$. These measurement noises $X_n$ also cause the occurrence of errors at the time of the positioning operation. The measurement noises $X_n$ become a factor that makes the control system unstable when having increased the gain of the position controller 1 or velocity controller 2. Especially, in a digital control system, the noises that are generated when performing the quantization of a sampling frequency band and when performing differentiation in the velocity computing unit 7 are high in level.

SUMMARY OF THE INVENTION

Therefore, an object of the present invention is to provide a position controlling apparatus which is capable of the effect of disturbance as small as possible by estimating a disturbance torque acting upon a drive mechanism and compensating for the torque correspondingly thereto in the position controlling apparatus.

Another object of the present invention is to eliminate the measurement noises when performing position detection to thereby prevent degradation of a disturbance suppression characteristic within a high-frequency band.

Still another object of the present invention is to reduce the effects of the measurement noises and differentiation noises within a sampling frequency band especially in a digital control system.

A position controlling apparatus according to the present invention comprises a position detector for detecting the position of a driven object to be driven by a motor, to thereby output a detected value of position. A Kalman filter estimates the position and velocity of the driven object from the detected value of position, thereafter outputting an estimated value of position and an estimated value of velocity. A disturbance estimating unit estimates the disturbance applied to the driven object from comparison with a command value of current and the estimated value of velocity, thereafter outputting this estimated current value of disturbance. A first subtracter computes a difference between a command value of position and the estimated value of position. A position controller computes a command value of velocity in accordance with the difference computed by the first subtracter. A second subtracter computes the difference between the estimated value of velocity and the command value of velocity. A velocity controller computes a target value of current in accordance with the difference computed by the second subtracter. A third subtracter computes a difference between the estimated current value of disturbance and the target value of current to thereby output this difference as the command value of current. The computed command value of current is applied to the disturbance estimating unit and a motor drive for driving a motor.

DESCRIPTION OF THE PREFERRED EMBODIMENT

Figure 1:
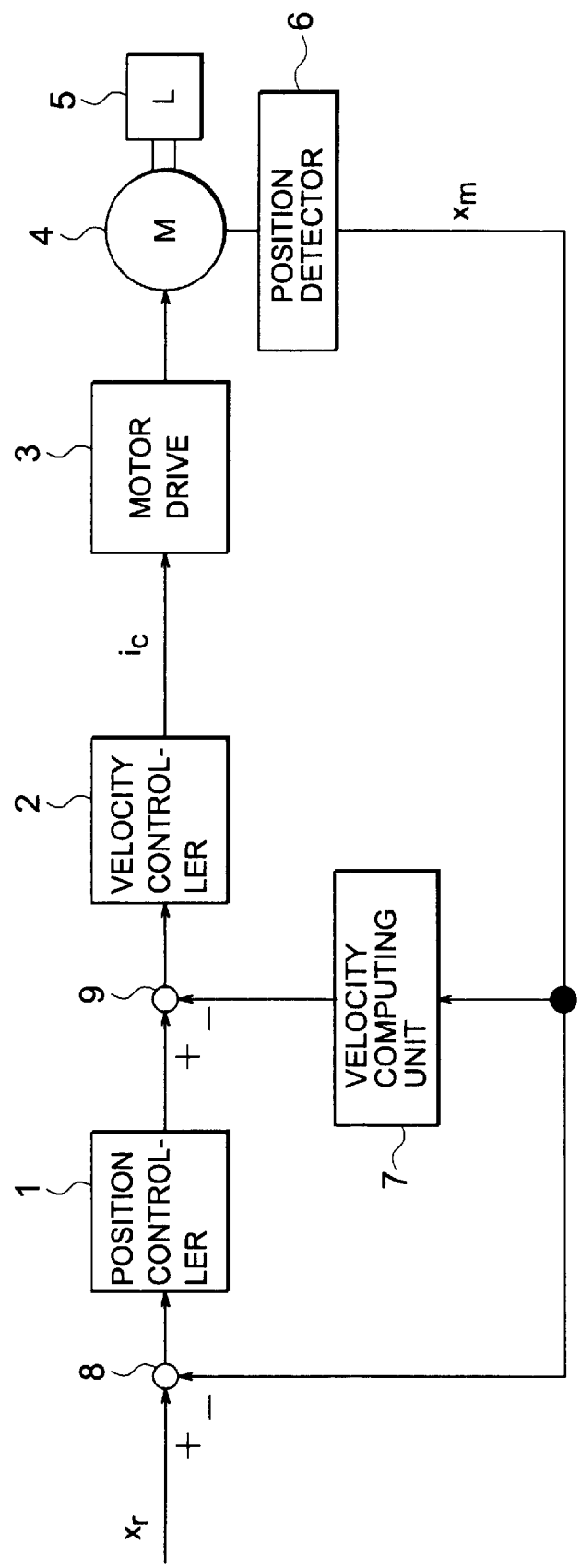
FIG. 1 is a block diagram illustrating the construction of a conventional position controlling apparatus.
Figure 2:
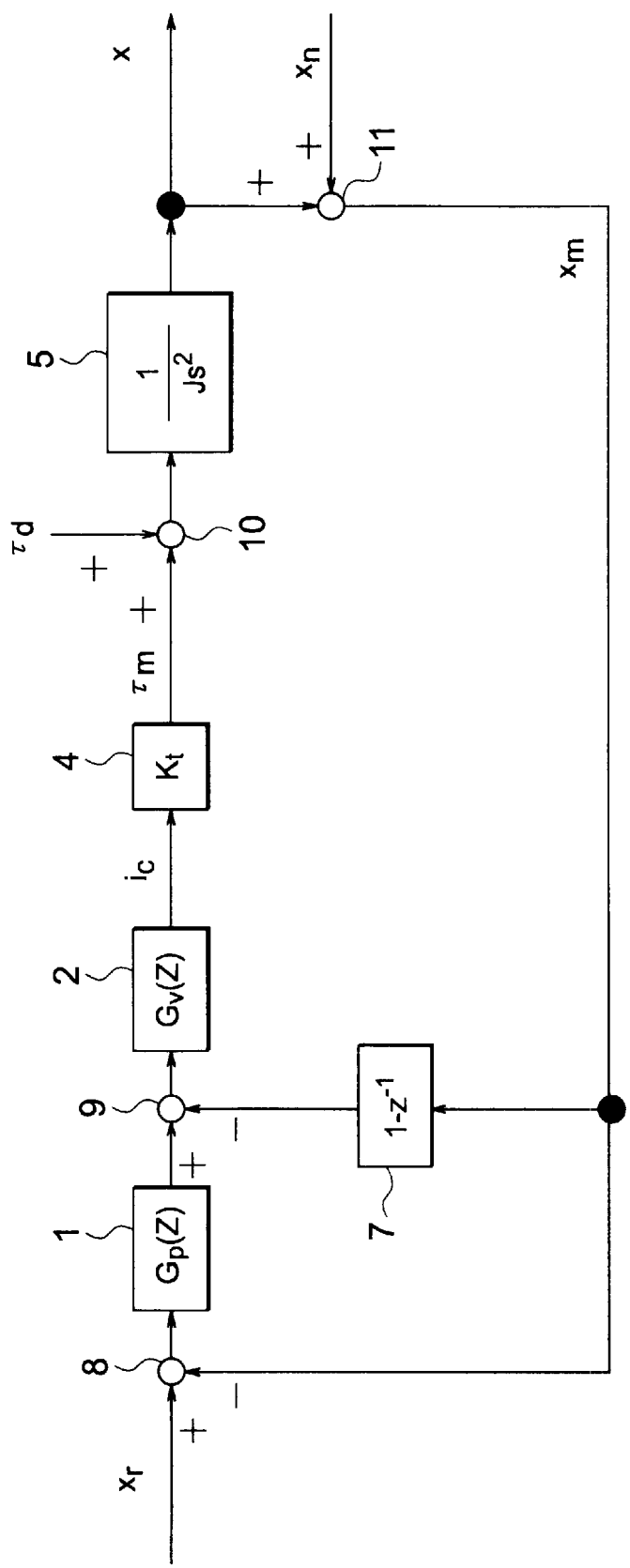
FIG. 2 is a block diagram of FIG. 1.
Figure 3:
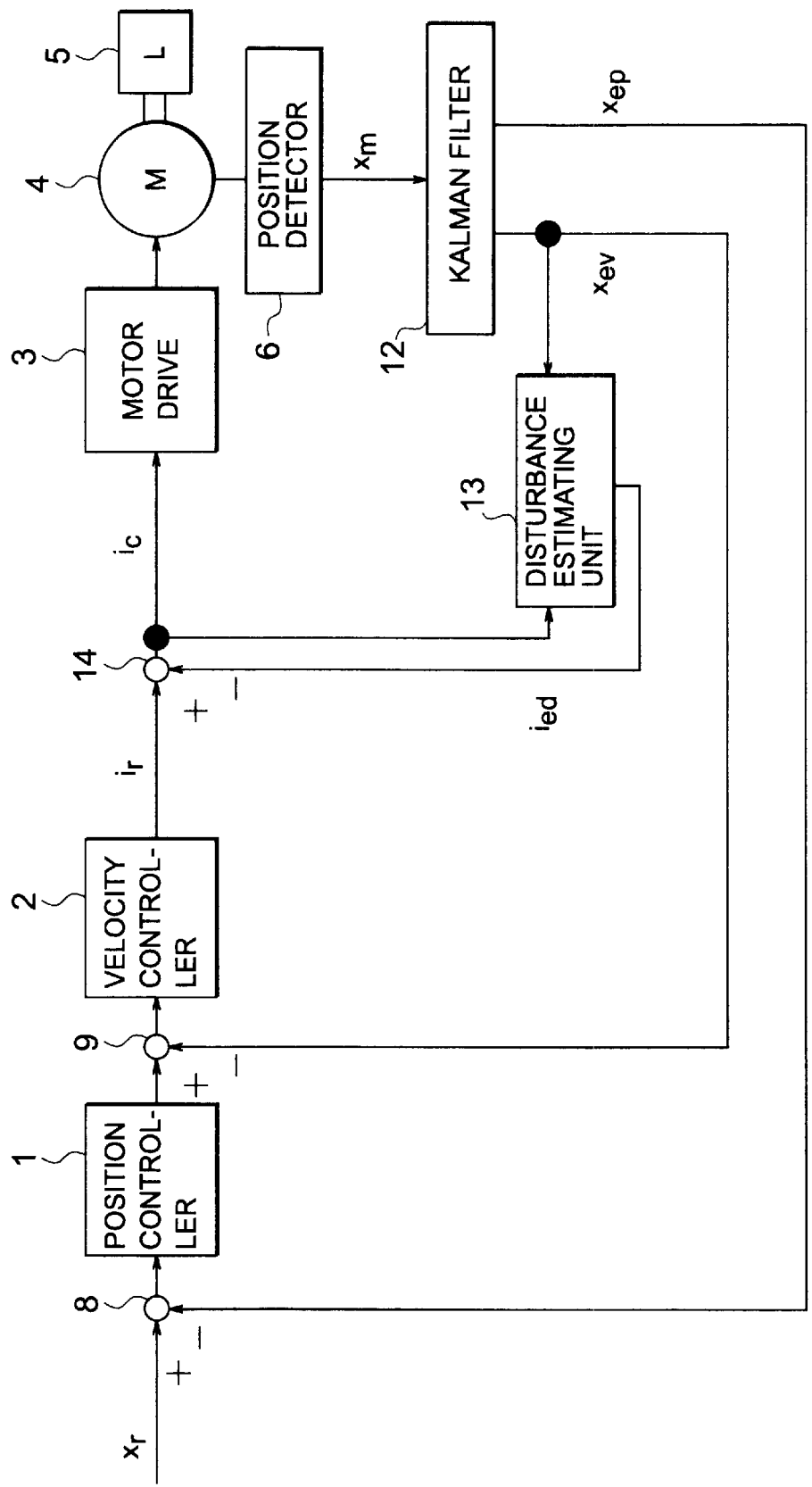
FIG. 3 is a block diagram illustrating the construction of a position controlling apparatus according to an embodiment of the present invention.

A position controlling apparatus according to an embodiment of the invention will now be explained with reference to FIGS. 3 and 4. In FIG. 3, the same portions as those in FIG. 1 are denoted by like reference numerals and their explanations are omitted. This embodiment is characterized by having added to the feedback line of the detected value $X_m$ of position a discrete Kalman filter 12, a disturbance estimating unit 13, and a subtracter 14 (a third subtracter). The disturbance estimating unit 13 is called a disturbance observer.

The Kalman filter 12 serves to compute an estimated value $X_{ep}$ of position and an estimated value $X_{ev}$ of velocity from the detected value $X_m$ of position. The subtracter 8 (a first subtracter) subtracts the estimated value $X_{ep}$ of position from a command value $X_r$ of position to thereby compute the position error. The position controller 1 amplifies the position error to thereby compute a command value of velocity. The subtracter 9 (a second subtracter) subtracts the estimated value $X_{ev}$ of velocity from the command value of velocity to thereby compute the velocity error. The velocity controller 2 amplifies the velocity error to thereby compute a target value $i_r$ of current.

The disturbance estimating unit 13 estimates disturbance applied to an object to be controlled from a command value $i_c$ of current and the estimated value $X_{ev}$ of velocity to thereby obtain an estimated current value $i_{ed}$ of disturbance. The subtracter 14 subtracts the estimated current value $i_{ed}$ of disturbance from the target value $i_r$ of currennt to thereby compute the command value $i_c$ of current. The computed command value $i_c$ of current is applied to the motor drive 3. The motor drive 3 drives the motor 4 in accordance with the command value $i_c$ of current.

Figure 4:
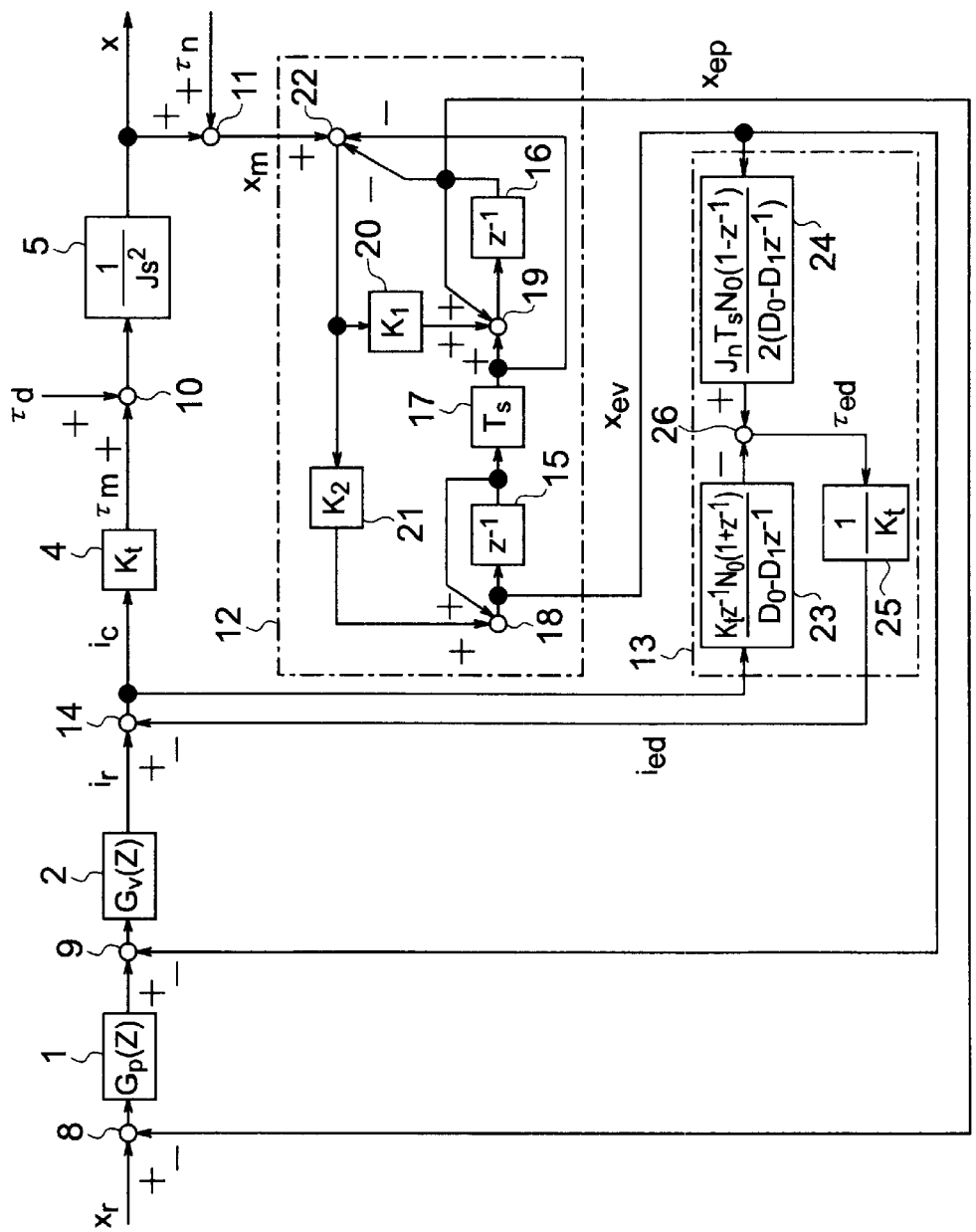
FIG. 4 is a block diagram of FIG. 3.

FIG. 4 is a block diagram of FIG. 3. In FIG. 4, the Kalman filter 12 includes, or is represented by, 1-sample lag factors 15 and 16 each defined by $z^{-1}$, a sample time length 17 defined by $T_s$, adders 18 and 19, and Kalman filter gains 20 and 21 defined by $K_1$ and $K_2$.

The disturbance estimating unit 13 includes, or is represented by, a motor torque model filter 23 (second means), a control object inverse model filter 24 (first means), a motor torque inverse model 25 (fourth means), and a subtracter 26 (third means).

The motor torque model filter 23 is defined by the motor torque model that is expressed by $[K_t z^{-1} N_0 (1+z^{-1})]/(D_0 - D_1 z^{-1})$.

The control object inverse model filter 24 is defined by the control object inverse model that is expressed by $[J_n T_s N_0 (1-z^{-1})]/[2(D_0 - D_1 z^{-1})]$.

The motor torque inverse model 25 is defined by $(1/K_t)$.

The measurement noise contained in the disturbance torque applied to the object to be controlled and the measurement noise contained in the detected value $X_m$ of position are considered to be white noises that respectively follow mutually independent normal distributions. The state quantity (position and velocity) of the object to be controlled in such a case can be estimated by the Kalman filter 12, which is expressed by the following equation (1).

$$\begin{bmatrix} x_{ep}(k) \\ x_{ev}(k) \end{bmatrix} = \begin{bmatrix} 1 & T_s \\ 0 & 1 \end{bmatrix} \begin{bmatrix} x_{ep}(k-1) \\ x_{ev}(k-1) \end{bmatrix} + \begin{bmatrix} K_1 \\ K_2 \end{bmatrix} \left[ x_m(k) - \begin{bmatrix} 1 & T_s \end{bmatrix} \begin{bmatrix} x_{ep}(k-1) \\ x_{ev}(k-1) \end{bmatrix} \right] \quad (1)$$

where $X_m(k)$ represents the detected value of position of the k-th sampled signal; $X_{ep}(k)$ represents the estimated value of position of the k-th sampled signal; $X_{ev}(k)$ represents the estimated value of velocity of the k-th sampled signal; and $T_s$ represents the sampling time length.

The Kalman filter 12 compares the detected value of position and the estimated value of position and feeds back an estimated error that is the compared result. The Kalman filter 12 thereby works so as to make small the difference between the true position and the estimated position of the object to be controlled. For this reason, the Kalman filter gain $K_1$ (20) and the Kalman filter gain $K_2$ (21) are determined so that the average value of the square of the difference between the true position and estimated position of the object to be controlled may become minimum. The quantization noise and differentiation noise in the digital control system are generated respectively from the sampled signal frequency and its higher harmonic. The Kalman filter 12 eliminates these measurement noises and thereby estimates the position and velocity of the object to be controlled.

Next, the disturbance estimating unit 13 functions as follows. The estimated value $X_{ev}$ of velocity of the object to be controlled that has been estimated by the Kalman filter 12 is the estimated state quantity that is obtained when the motor torque $\tau_m$ and the disturbance torque $\tau_d$ have been applied to the object to be controlled. By multiplying this estimated value $X_{ev}$ of velocity by the control object inverse model (24), an estimated disturbance torque ($\tau_m + \tau_d$) that is applied to the object to be controlled is computed. Also, by multiplying the command value $i_c$ of current by the motor torque model (23), an estimated value $\tau_{em}$ of torque is computed. The difference between the both is computed through the operation of the subtracter 26 to thereby obtain an estimated torque $\tau_{ed}$ of disturbance. At this time, in order to restrain the range from within which the disturbance torque is estimated, low-pass filter characteristics are imparted to the control object inverse model (24) and motor torque model (23). By multiplying the estimated torque $\tau_{ed}$ of disturbance by the motor torque inverse model (25), the estimated current value $i_{ed}$ of disturbance is computed. In the subtracter 14, this estimated current value $i_{ed}$ of disturbance is subtracted from the target value $i_r$ of torque to thereby cancel therefrom the component corresponding to the disturbance torque, the resulting value determined as being the command value $i_c$ of current. The immediately preceding operation is carried out through the use of the following equations (2) and (3).

$$\tau_{ed}(k) = \frac{J_n T_s N_0 (1 - z^{-1})}{D_0 - D_1 z^{-1}} x_{ev}(k) - \frac{K_t z^{-1} N_0 (1 + z^{-1})}{D_0 - D_1 z^{-1}} i_c(k) \quad (2)$$

$$\tau_c(k) = i_r(k) - \frac{1}{K_t} \tau_{ed}(k) \quad (3)$$

As apparent from the foregoing explanation, initially, the estimated value of velocity is computed by the Kalman filter. Subsequently, the estimated value of disturbance is computed by the disturbance estimating unit from the command value of current and this estimated value of velocity. And, by subtracting the computed estimated value of disturbance from the target value of current, the disturbance is canceled whereby the command value of current is computed. The object to be controlled is driven using this command value of current, and therefore the effect of the disturbance upon this driving can be reduced.

Also, the disturbance estimating unit is structured independently of the position controller and the velocity controller. Therefore, it is possible to achieve the suppression of the disturbance only, without changing the gain of either the position controller or the velocity controller. Therefore, the control system does not become unstable.

Further, the amounts of feedback that are fed back to the position controller and the velocity controller are determined to be the estimated value of position and the estimated value of velocity that have the measurement noises eliminated therefrom by the Kalman filter. Therefore, even when the gains of the position controller and velocity controller are made high or even when the response band of the disturbance estimating unit is made high, it is less likely that the control system becomes unstable.

Incidentally, although the present invention is suitable for the position controlling apparatus for a straight-line movement system such as an X—Y table, the present invention can needless to say be applied to the position controlling apparatus for a rotary movement system.

What is claimed is:

1. A position controlling apparatus comprising:
   a position detector for detecting a position of a driven object to be driven by a motor to the thereafter output a detected value of position;
   a Kalman filter for estimating the position and velocity of the driven object from the detected value of position to thereby output an estimated value of position and an estimated value of velocity;
   a disturbance estimating unit for estimating disturbance applied to the driven object by comparison with a command value of current and the estimated value of velocity to thereby output an estimated value of disturbance;
   a first substracter for computing a difference between a command value of position and the estimated value of position;
   a position controller for computing a command value of velocity in accordance with the difference computed by the first subtracter;
   a second subtracter for computing a difference between the estimated value of velocity and the command value of velocity;
   a velocity controller for computing a target value of current in accordance with the difference computed by the second subtracter; and
   a third subtracter for computing a difference between the estimated current value of disturbance and the target value of current to thereby output the difference as the command value of current, whereby the command value of current is applied to the disturbance estimating unit and a motor drive for driving motor, wherein
   a position controlling apparatus wherein the Kalman filter performs the operation that is given by the following equation:

$$\begin{bmatrix} x_{ep}(k) \\ x_{ev}(k) \end{bmatrix} = \begin{bmatrix} 1 & T_s \\ 0 & 1 \end{bmatrix} \begin{bmatrix} x_{ep}(k-1) \\ x_{ev}(k-1) \end{bmatrix} + \begin{bmatrix} K_1 \\ K_2 \end{bmatrix} \begin{bmatrix} x_m(k) - \begin{bmatrix} 1 & T_s \end{bmatrix} \begin{bmatrix} x_{ep}(k-1) \\ x_{ev}(k-1) \end{bmatrix} \end{bmatrix} \quad (1)$$

2. A position controlling apparatus as claimed in claim 1, wherein the disturbance estimating unit comprises first means for computing an estimated disturbance torque from the estimated value of velocity, second means for computing an estimated value of torque from the command value of current, third means for computing a difference between the estimated disturbance torque and the estimated value of torque as an estimated torque of disturbance, and fourth means for computing the estimated current value of disturbance from the estimated torque of disturbance.

* * * * *